(12) United States Patent
Gryp et al.

(10) Patent No.: US 6,616,117 B2
(45) Date of Patent: Sep. 9, 2003

(54) SEAT SUSPENSION HEIGHT ADJUSTMENT APPARATUS

(75) Inventors: Dennis J. Gryp, East Moline, IL (US); Dale Ropp, Buda, IL (US); Colton Anderson, Wyoming, IL (US)

(73) Assignee: Sears Manufacturing Co., Davenport, IA (US)

( * ) Notice: Subject to any disclaimer, the term of this patent is extended or adjusted under 35 U.S.C. 154(b) by 0 days.

(21) Appl. No.: 10/074,720

(22) Filed: Feb. 12, 2002

(65) Prior Publication Data

US 2002/0070326 A1 Jun. 13, 2002

Related U.S. Application Data

(63) Continuation of application No. 09/528,390, filed on Mar. 20, 2000, now abandoned.

(51) Int. Cl.[7] ................................................ F16M 13/00
(52) U.S. Cl. .................. 248/588; 248/421; 297/344.15
(58) Field of Search ................. 248/421, 888, 248/564, 566, 562, 556, 557, 157, 588, 429; 296/65.1, 68.1; 297/216.15, 344.15

(56) References Cited

U.S. PATENT DOCUMENTS

| | | | | |
|---|---|---|---|---|
| 3,787,025 A | * | 1/1974 | Sturhan ....................... 248/399 |
| 3,999,800 A | | 12/1976 | Penzotti | |
| 4,681,292 A | * | 7/1987 | Thomas ....................... 248/584 |
| 4,913,482 A | * | 4/1990 | Hanai et al. ................ 296/65.1 |
| 5,112,018 A | * | 5/1992 | Wahls ......................... 248/394 |
| 5,176,355 A | | 1/1993 | Carter | |
| 5,358,305 A | * | 10/1994 | Kaneko et al. ............. 296/65.1 |
| 5,927,679 A | * | 7/1999 | Hill ............................. 248/588 |
| 5,984,410 A | * | 11/1999 | Brodersen ................... 297/339 |
| 6,193,297 B1 | * | 2/2001 | Vandermolen ............. 296/68.1 |
| 6,241,209 B1 | * | 6/2001 | Von Mayenburg et al. . 248/421 |

FOREIGN PATENT DOCUMENTS

| | | |
|---|---|---|
| GB | 912396 | 1/1961 |
| GB | 961999 | 9/1962 |
| GB | 1160185 | 4/1968 |
| GB | 1282213 | 6/1970 |
| GB | 1357414 | 5/1971 |
| GB | 1601370 | 11/1977 |
| JP | 9109757 | 4/1997 |

* cited by examiner

*Primary Examiner*—Anita King
*Assistant Examiner*—Tan Le
(74) *Attorney, Agent, or Firm*—Niro, Scavone, Haller & Niro

(57) ABSTRACT

A height adjustable seat suspension having first and second bases connected by a linkage assembly with an air spring and shock disposed between the bases. The shock dampens vertical movement of the bases and the air spring increases in air volume to raise the seat height of the suspension and decreases in air volume to lower the seat height of the suspension. A threaded rod is also included as part of the shock which is threadably engaged with a collar that is rotated by a drive source. The engagement between the threaded portions of the rod and collar axially repositions the rod with respect to said collar to change the effective length of, the shock.

4 Claims, 7 Drawing Sheets

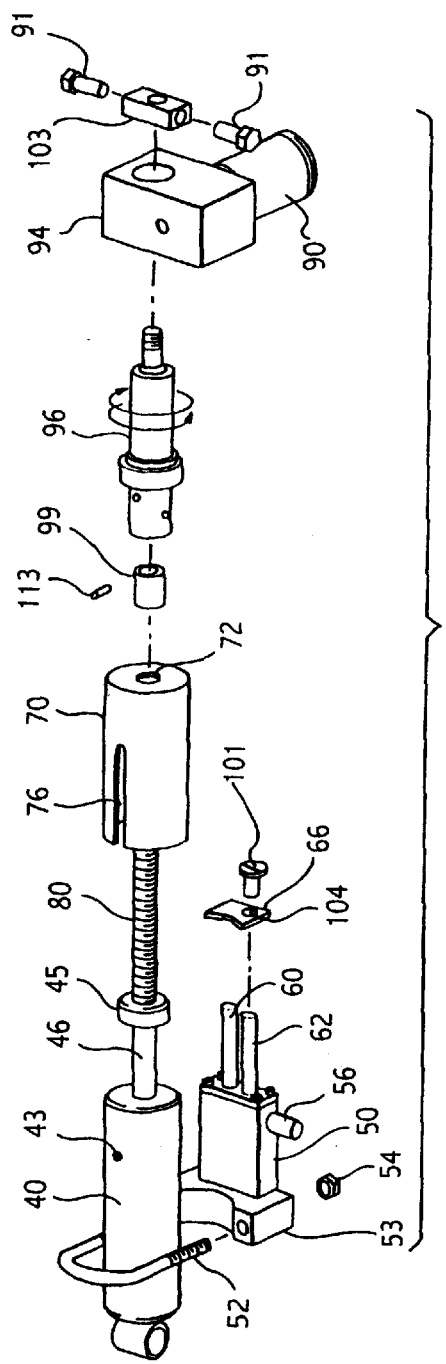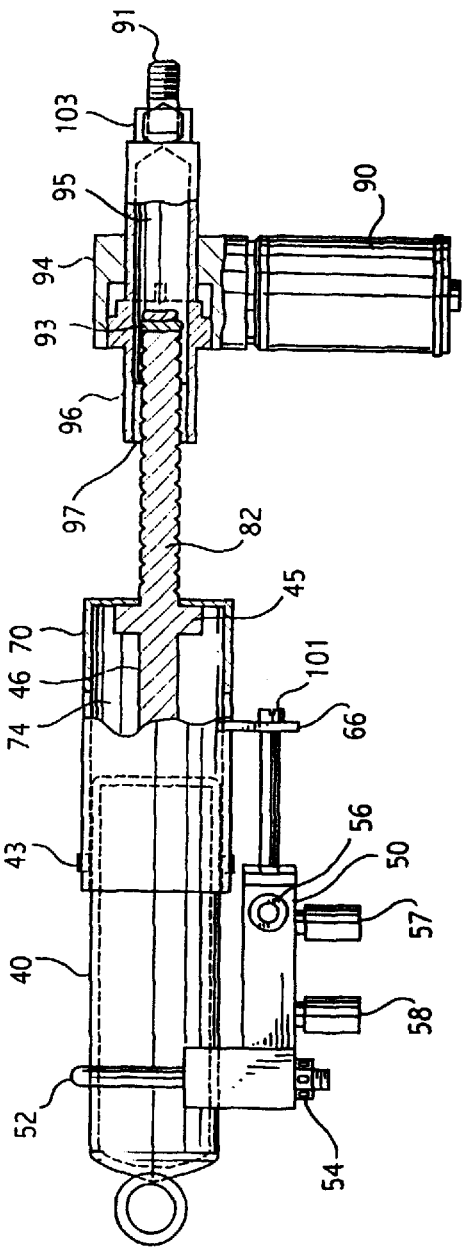

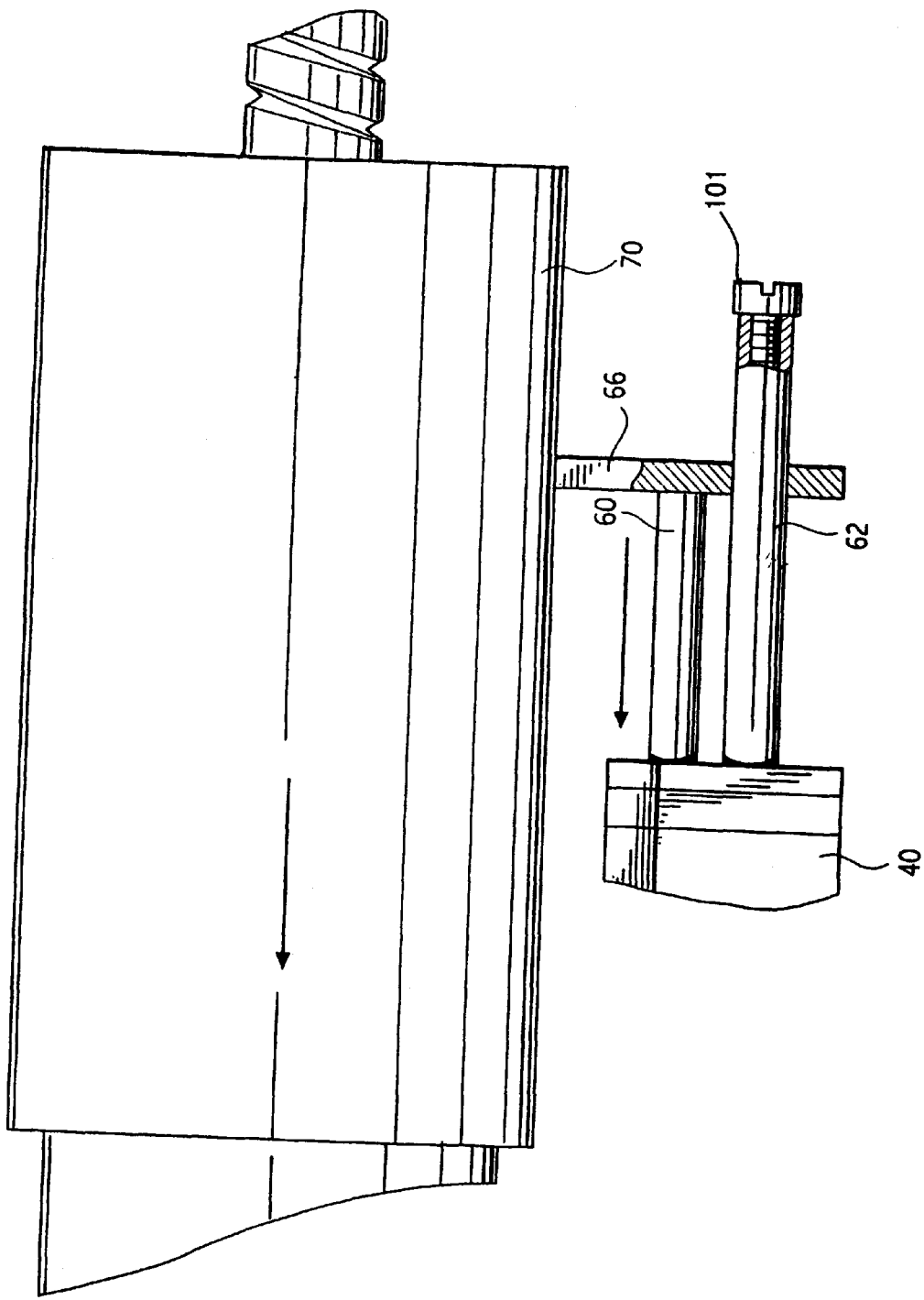

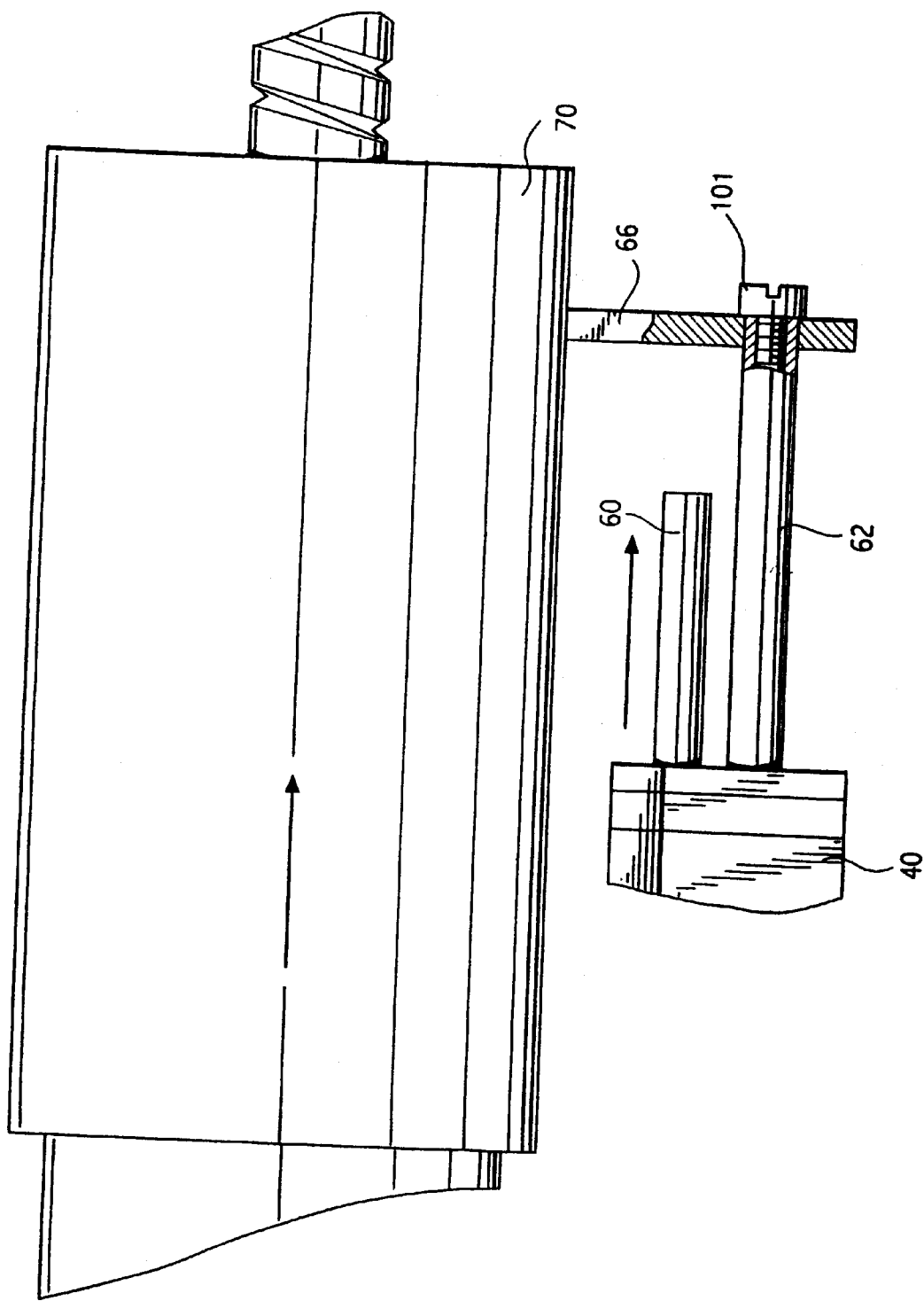

US 6,616,117 B2

SEAT SUSPENSION HEIGHT ADJUSTMENT APPARATUS

This application is a continuation of prior application Ser. No. 09/528,390, filed on Mar. 20, 2000 which is now abandoned. The present invention relates to seat suspensions and, more particularly, to a unique height adjustment mechanism that allows the height of a seat suspension to be adjusted while maintaining consistent shock dampening. The present invention uses a small output electric motor that operates a valve which, in turn, controls the air volume inside an air spring, thereby adjusting the height of the suspension.

BACKGROUND OF THE INVENTION

SUMMARY OF THE INVENTION

In one embodiment of the present invention, a shock absorber or dampener is provided which uses a drive to adjustably control the effective axial length of the shock in order to accommodate a plurality of seat heights. The length of the shock is adjusted by providing threads on a rod that forms part of the shock assembly which coact with threads associated with the drive source. The operation of the drive and subsequent coaction between the threads causes the rod to thread axially changing the effective length of the rod and the overall length of the shock.

In another embodiment of the present invention, an actuator is further provided with the device. The actuator moves axially in conjunction with the rod and is used to adjust the height of a seat suspension. As the actuator moves axially, it operates a valve that controls air flow into and out of the air spring. The actuator causes air to flow into the spring to increase the seat height and exhausts air to decrease the seat height.

DESCRIPTION OF THE DRAWINGS

These and other features, objects and advantages of the present invention will become apparent from the following description and drawings wherein like reference numerals represent like elements in several views, and in which:

FIG. 2 is an exploded perspective view of a shock absorber used with the embodiment shown in FIG. 1;

FIG. 3 is cross-sectional view of the shock absorber shown in FIG. 2;

FIG. 7 is a side view showing actuation of a valve stem of the present invention; and FIG. 8 is a side view showing the actuation of another valve stem of the present invention.

DETAILED DESCRIPTION OF THE PREFERRED EMBODIMENTS

Set forth below is a description of what are currently believed to be the preferred embodiments or best examples of the invention claimed. Future and present alternatives and modifications to the preferred embodiments are contemplated. Any alternates or modifications having insubstantial changes in function, in purpose, in structure or in result are intended to be covered by the claims of this patent.

Figure 1:
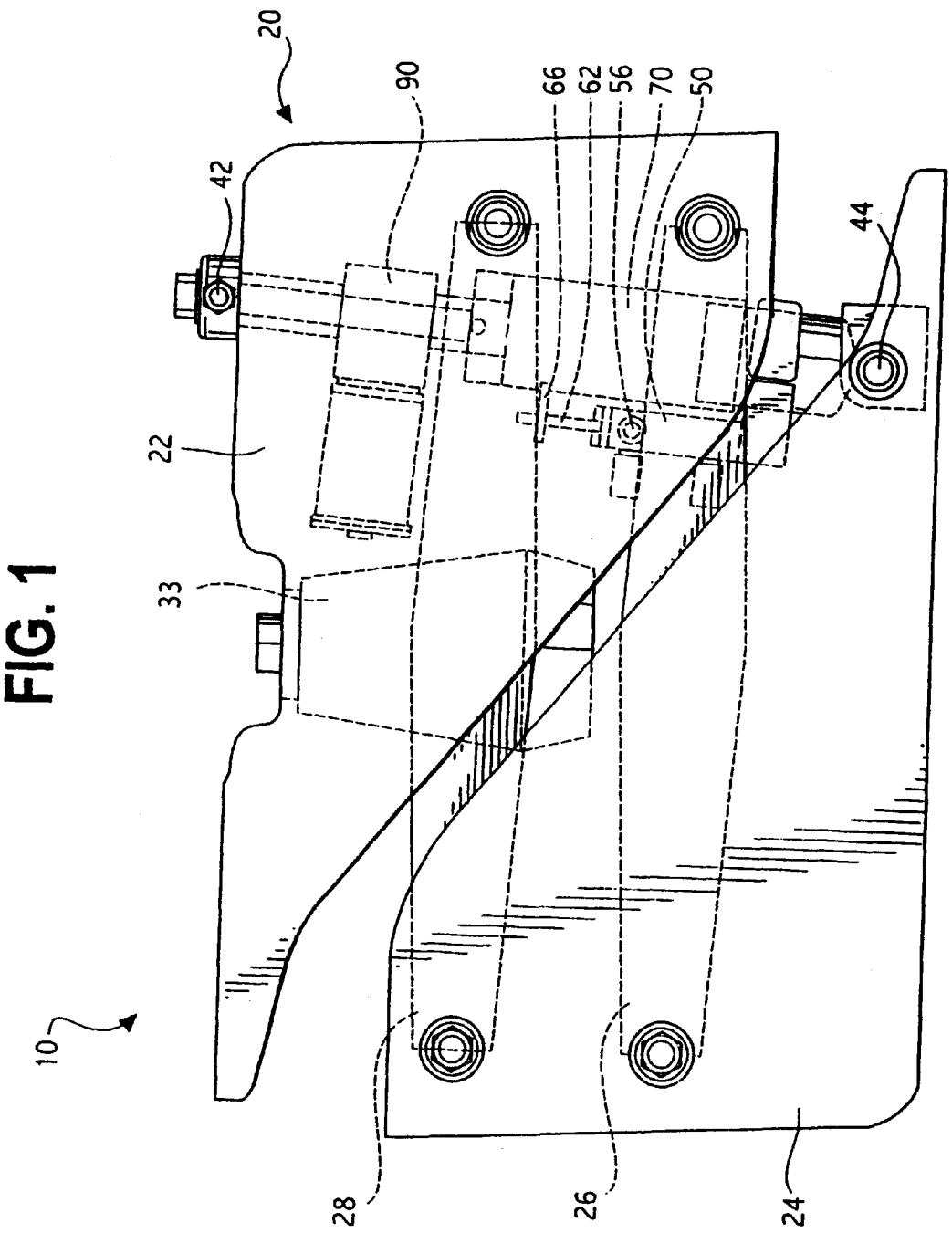
FIG. 1 is a side view of one embodiment of the present invention.

As shown in FIG. 1, seat suspension 10 may consist of a parallelogram seat assembly 20, the design of which is known to those of skill in the art. As shown, assembly 20 consists of a first support base 22 and opposingly located support base 24. Bases 22 and 24 are connected by a linkage assembly consisting of two sets of arms 26 and 28 which, together, form the general parallelogram assembly 20.

Figure 5:
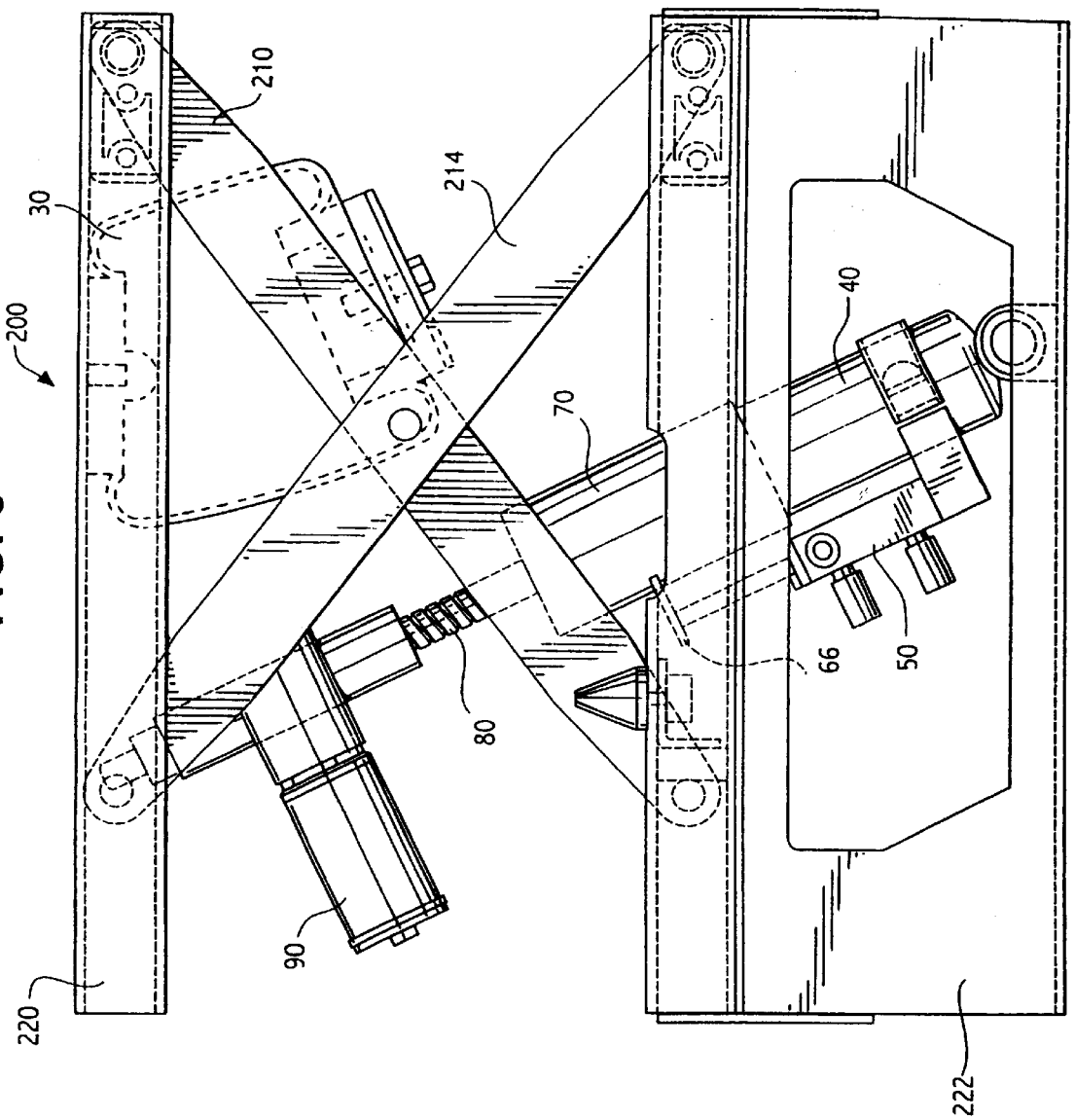
FIG. 5 is a side view of an alternate embodiment of the present invention using a scissors-type seat suspension shown in an extended position.
Figure 6:
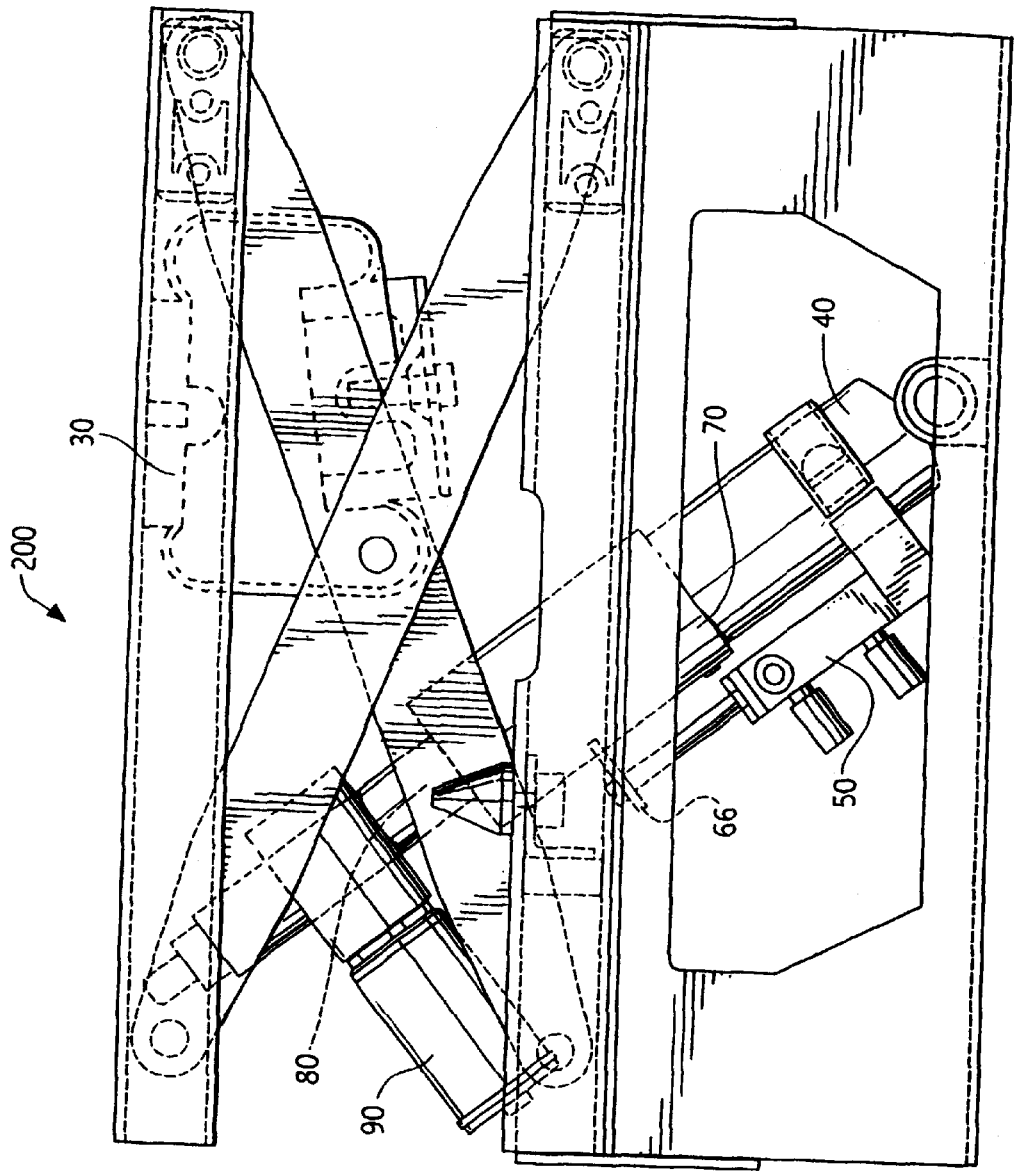
FIG. 6 is a side view of the embodiment shown in FIG. 5 in a lowered position.

The present invention may also work with other known seat suspensions as well. As shown in FIGS. 5 and 6, the present invention may also be used with a scissors-type seat suspension.

Disposed between bases 22 and 24 is an air suspension spring 30. Spring 30 is a bladder or bag, with the volume of air inside the spring setting the height of the seat suspension by controlling the distance between bases 22 and 24. The air used to operate spring 30 is supplied from a compressor typically located remotely from the seat on the piece of equipment or vehicle. The design, construction, and use of spring 30 are also well known to those of ordinary skill in the art and a spring manufactured by Firestone may be used with the present invention.

Attached to bases 22 and 24 is dampener 40 which functions as a shock absorber which restricts the vertical movement of bases 22 and 24. In one embodiment, the dampener may be a fluid-based system such as a hydraulic dampener manufactured by Tenneco. Of course, other types of dampeners or shock absorbers may also be used with the present invention such as spring, air and other dampening systems known to those of skill in the art.

Dampener 40 is affixed to base 22 by mount 42 and to base 24 by mount 44. In general, dampening is achieved by the depression of plunger 46 which forces a fluid through a restrictive orifice located inside dampener 40. A rubber bumper 45 is located on plunger 46 which acts as a shock absorber and stop.

Mounted to dampener 40 is air supply control valve 50 which controls the air volume inside air spring 30. As shown, value 50 may be mounted to dampener 40 by U-bolt 52, bracket 53, and fasteners 54. Valve 50 is in communication with both air spring 30 and the air supply compressor located on the equipment or vehicle. Valve 50 has an exhaust port 56 which exhausts air from spring 30; an air supply port 57, which supplies air to spring 30 via a hose (not shown); and an inlet port 58, which is connected to the air supply through the use of a hose.

Extending outwardly from valve 50 are two valve stems 60 and 62, which control the volume of air in spring 30. When valve stem 60 is depressed, air is added to spring 30 via port 57. When valve stem 62 is extended, air is exhausted from spring 30 via port 56. When valve stems 60 and 62 are in a neutral position, air is not added to or exhausted from spring 30.

The operation of valve 50 is controlled by actuator 66 which is connected to anti-rotator sleeve 70. Disposed within sleeve 70 through aperture 72 is extension rod 80 which is affixed to or extends from plunger 46 and is also secured to sleeve 70 to further form part of the shock assembly. As is also shown in FIG. 3, extension rod 80, bumper 45 and plunger 46 may be located within interior 74 of sleeve 70. An elongated groove or track 76 is further located on sleeve 70 and is sized to slidingly receive boss 43 located on the outer housing of valve 40.

Figure 4:
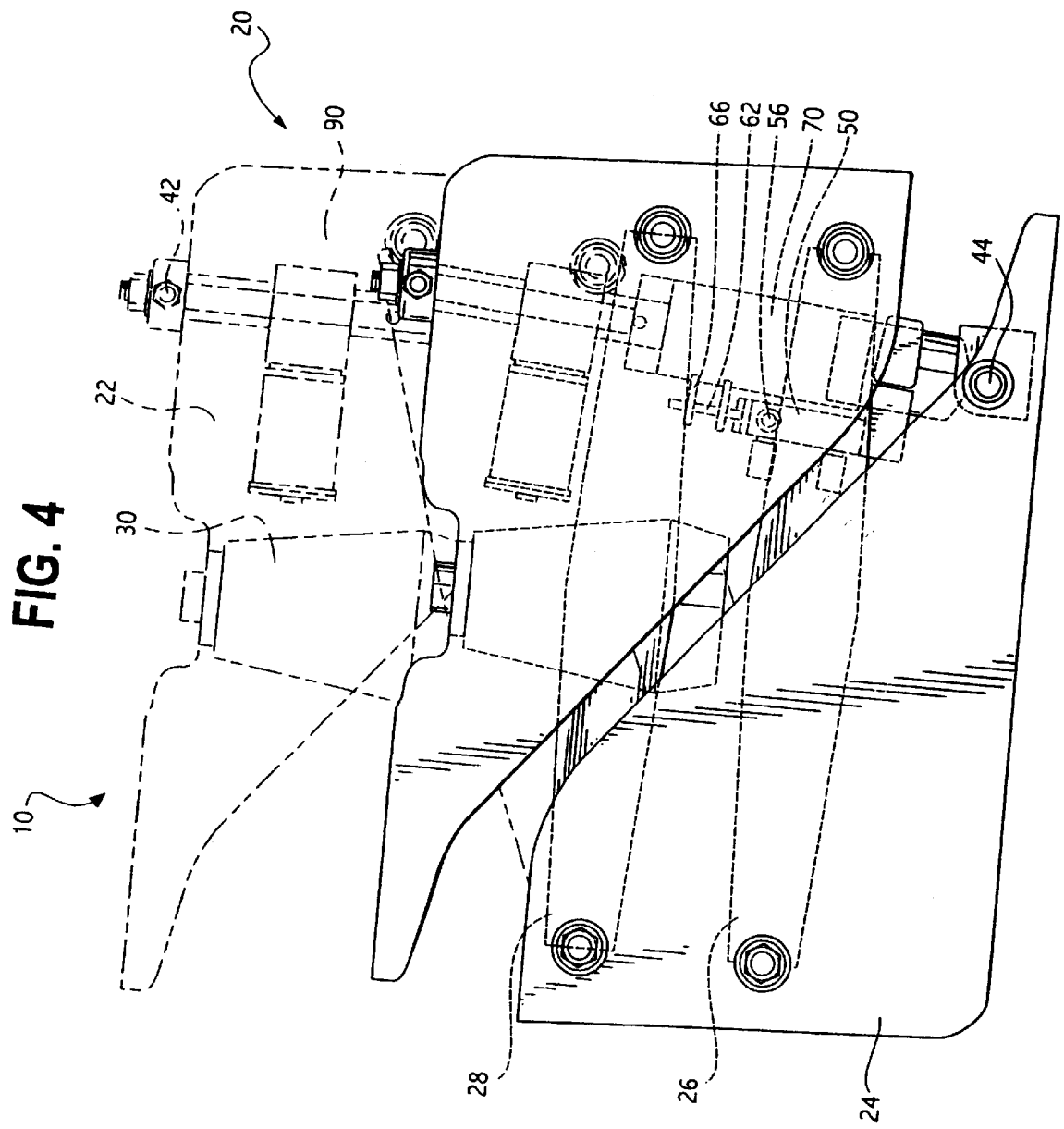
FIG. 4 is a side view of the embodiment shown in FIG. 1 in multiple height adjustments.

As shown in FIGS. 3 and 4, an electric motor 90 is used to adjust the effective length of shock 40 by controlling the length of rod 80. As shown in FIGS. 1 and 4, motor 90 may be mounted to suspension 10 by fasteners 91, block 103, or by other fastening or mounting means known to those of skill in the art.

To change or adjust the length of rod 80, and consequently shock 40, gear assembly 94 includes an elongated aperture 95 sized to receive rod 80 and a collar 96 which includes internal threads 97 which threadably engage threads 82 on rod 80. Threads 97 may be formed directly on collar 96 or be part of an internal sleeve 99 which is secured to collar 96 by pin 113. The coaction between threads 97 and 82 causes rod 80 to travel axially. FIG. 4 shows how the length of rod 80 is changed to accommodate various seat heights.

In another embodiment, the seat suspension used may be a scissors-type seat suspension which is shown in FIGS. 5 and 6. The design, construction, and operation of this type of seat suspension are generally described in U.S. Pat. Nos. 4,856,763 and 5,580,027, which are incorporated herein by reference. As shown, seat suspension 200 includes a linkage assembly consisting of scissor arms 210 and 212 which are connected to opposingly located base sections 220 and 222. The other components making up the height adjustment system are incorporated into suspension 200 in the manner described above. Again, as shown in FIGS. 5 and 6, the length of rod 80 is changed to accommodate various seat heights.

In use, the present invention uses a small output drive such as an electrical motor 90 to change the length of the shock to accommodate a wide variety of seat heights. It has also been found that the small output drive source may also be used to control the height of the seat by controlling the amount of air either inputted to or exhausted from air spring 30. For example, to accommodate a lower seat height, the effective length of rod 80, as well as the overall length of shock 40, must be decreased. To accomplish this, collar 96 is rotated in the appropriate direction which causes a portion of rod 80 to thread axially into aperture 95 of collar 96 by having collar 96 be threadably engaged with threads 82 on rod 80. As rod 80 travels axially into collar 96, sleeve 70 moves axially as well. In turn, actuator 66 moves axially toward base section 22 which moves actuator 66 out of a neutral position with respect to stems 60 and 62. More specifically, stem 60 remains inactive since it must be depressed to add air to spring 30. However, actuator 66 activates stem 62 by pulling it toward base 22 through the use of fastener 101. This exhausts air from air spring 30 until, by movement of base section 22 downwardly, actuator 66 is returned to its neutral position which deactivates valve stem 62 and terminates the exhaustion of air from spring 30.

To raise the height of seat suspension 10, motor 90 is activated and the rotation of internal threads 97 and the coaction with threads 82 cause the effective length of rod 80 to increase. As the effective length of the rod increases, sleeve 70 axially moves toward base 24 and so does actuator 66. This, again, moves actuator 66 out of a neutral position, depressing valve stem 60 which causes air to flow into spring 30 thus increasing its volume and the height of the seat suspension. As air volume is added, actuator 66 moves back into a neutral position which terminates the operation. Valve stem 62 and fastener 101 are unaffected since they will have traveled through aperture 104 located on actuator 66 during this operation.

Alternatively, threads 97 may remain fixed or anti-rotational, and rod 80 may be rotated by the drive source to provide the desired length adjustment.

One advantage of the invention is that the effective length of the shock may be changed to accommodate changes in seat height. As described, this is accomplished by coacting threads 82 and 97 and the use of the small output drive 90.

Another advantage of the present invention is that changes in the length of shock 40 may also be used to operate air spring 30. This allows spring 30 to perform most of the work of actually adjusting the height of the suspension.

Consistent dampening is also maintained with the present invention. Once the adjustment is made to the length of rod 80 and shock 40, the length of plunger 46, while temporarily changed, will return to its optimal stroke at the center of the ride zone once a neutral position is re-obtained by the action of the air spring.

In addition, the adjustment system also provides an ability to preset the seat height. By maintaining the proper spacial relationship between the length of rod 80 as it corresponds to a particular air volume and seat height, each time the air supply is activated, the suspension will return to the previously preset height once a neutral position is re-established.

While the invention has been described with reference to the preferred embodiments thereof, it will be appreciated that numerous variations, modifications, and alternate embodiments are possible, and accordingly, all such variations, modifications, and alternate embodiments are to be regarded as being within the spirit and scope of the invention.

What is claimed is:

1. A height adjustable seat suspension comprising:

first and second bases connected by a linkage assembly;

a shock disposed between said bases, said shock dampens movement of the bases;

a rod having an externally threaded portion, said rod forming part of the shock;

a drive source;

a rotatable collar driven by said drive source, said collar having internal threads that threadably engage said threaded portion of said rod, said engagement axially positions said collar on said rod to change the effective length of said shock to accommodate a change in seat height.

2. The device of claim 1 wherein said drive source is an electric motor.

3. The device of claim 1 wherein said rod is stationary.

4. A height adjustable seat suspension comprising:

first and second bases connected by a linkage assembly;

an air spring and shock disposed between said bases;

said shock dampens vertical movement of the bases;

said air spring increases in air volume to raise the seat height of the suspension and decreases in air volume to lower the seat height of the suspension;

a rod having a threaded portion, said rod forming part of the shock;

an actuator attached to said rod, said actuator in communication with a valve which controls the air volume in said air spring;

a drive source having a rotatable collar that threadably engages said threaded portion of said rod, said engagement axially repositions said rod with respect to said collar to change the effective length of said shock to accommodate a change in seat height; and said engagement axially repositions said actuator with respect to said valve to activate said valve to change the air volume of said spring to effectuate a change in seat height.

* * * * *